United States Patent
Jindal et al.

(10) Patent No.: US 9,475,445 B2
(45) Date of Patent: Oct. 25, 2016

(54) VEHICLE AIRBAG APPENDAGE

(71) Applicant: Ford Global Technologies, LLC, Dearborn, MI (US)

(72) Inventors: Pardeep Kumar Jindal, Canton, MI (US); Djamal Eddine Midoun, Ann Arbor, MI (US); Edward Joseph Abramoski, Canton, MI (US); Rahul Makwana, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/467,490

(22) Filed: Aug. 25, 2014

(65) Prior Publication Data
US 2016/0052476 A1   Feb. 25, 2016

(51) Int. Cl.
*B60R 21/231*   (2011.01)
*B60R 21/206*   (2011.01)
*B60R 21/233*   (2006.01)
*B60R 21/239*   (2006.01)

(52) U.S. Cl.
CPC ........... *B60R 21/206* (2013.01); *B60R 21/231* (2013.01); *B60R 21/233* (2013.01); *B60R 21/239* (2013.01); *B60R 2021/23169* (2013.01); *B60R 2021/23176* (2013.01); *B60R 2021/23308* (2013.01)

(58) Field of Classification Search
CPC .................. B60R 2021/23308; B60R 21/206; B60R 21/233; B60R 21/239; B60R 2021/23176
USPC ...................................................... 280/730.2
See application file for complete search history.

(56) References Cited

U.S. PATENT DOCUMENTS

| 5,486,019 A | * | 1/1996 | Chevroulet et al. ....... 280/730.1 |
| 8,500,161 B2 | | 8/2013 | Chavez |
| 8,696,019 B2 | | 4/2014 | Chavez et al. |
| 2005/0151351 A1 | | 7/2005 | Enders et al. |
| 2009/0085333 A1 | * | 4/2009 | Imaeda ............... B60R 21/2032 280/730.1 |
| 2010/0213692 A1 | * | 8/2010 | Nagai et al. .................. 280/729 |
| 2011/0101660 A1 | * | 5/2011 | Schneider ............. B60R 21/206 280/731 |
| 2011/0156378 A1 | * | 6/2011 | Matsushima ......... B60R 21/231 280/730.1 |
| 2011/0175334 A1 | * | 7/2011 | Miller et al. ............... 280/730.2 |
| 2013/0001936 A1 | * | 1/2013 | Nagasawa et al. ........... 280/731 |
| 2015/0074969 A1 | * | 3/2015 | Jindal et al. .................... 29/428 |

FOREIGN PATENT DOCUMENTS

| CN | 102887128 A | | 1/2013 | |
| DE | 202006005872 U1 | | 6/2006 | |
| GB | 2493051 A | | 1/2013 | |
| WO | WO 2005113299 A1 | * | 12/2005 | ........... B60R 21/231 |
| WO | WO 2013041406 A1 | * | 3/2013 | ........... B60R 21/206 |

OTHER PUBLICATIONS

Broussard et al., Motor Vehicle Comprising a Knee Airbag, and Knee Airbag for Integrating Into a Motor Vehicle, Dec. 1, 2005, EPO, WO 2005/113299 A1, Machine Translation of Description.*

* cited by examiner

*Primary Examiner* — James English
(74) *Attorney, Agent, or Firm* — Frank A. MacKenzie; Bejin Bieneman PLC

(57) ABSTRACT

An airbag includes a primary portion and a secondary portion. The primary portion defines a first chamber and the secondary portion defines a second chamber fluidly connected to the first chamber. The primary portion further defines a center axis and the secondary portion is disposed at least partially along the center axis. In its unexpanded state, the airbag may be disposed under an instrument cluster.

15 Claims, 4 Drawing Sheets

VEHICLE AIRBAG APPENDAGE

BACKGROUND

The New Car Assessment Program (NCAP) was created in 1979 by the US National Highway Traffic Safety Administration. In the United States, NCAP defines a 5-star rating system for vehicles based on impact test data. Companion programs are located throughout the world including Europe (Euro NCAP), Australia and New Zealand (ANCAP), Latin America (Latin NCAP), and China (C-NCAP). These programs periodically update their requirements for earning the highest rating.

DETAILED DESCRIPTION

One way to improve vehicle safety is to reduce the force applied to an occupant's leg, specifically the driver's leg, following an impact. Immediately after certain types of impacts, one or both of the driver's legs are susceptible to move laterally. This lateral movement may cause one of the driver's feet to hit one of the pedals. Such lateral movement can be mitigated with a knee airbag that has an appendage. The unexpanded airbag may be located beneath an instrument panel. After an impact, the airbag, along with the appendage, may expand. The appendage may be generally located along a center axis of the airbag so that the appendage may expand into an area between the driver's legs. The appendage may limit lateral movement of the driver's legs, thus reducing the force applied from, e.g., the driver's leg or foot hitting one of the pedals.

The elements shown may take many different forms and include multiple and/or alternate components and facilities. The exemplary components illustrated are not intended to be limiting. Indeed, additional or alternative components and/or implementations may be used.

Figure 1:
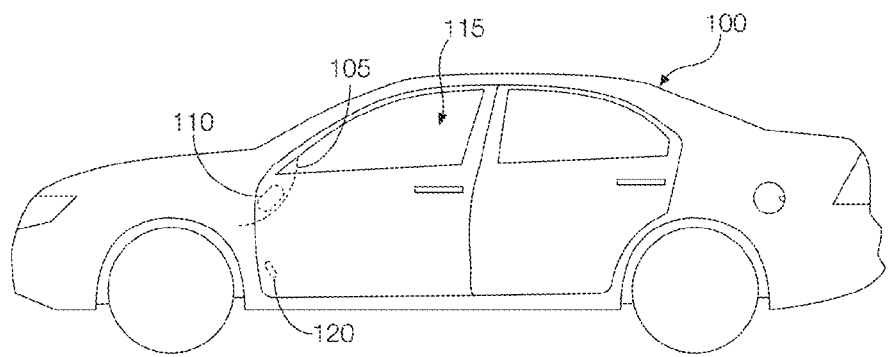
FIG. 1 illustrates an example vehicle having an airbag that can reduce certain forces that may be applied to an occupant's leg or foot following an impact.

As illustrated in FIG. 1, the vehicle 100 includes an instrument panel 105 and an airbag 110 stowed in an unexpanded state in or below the instrument panel 105. Both the instrument panel 105 and the airbag 110 may be located in a passenger compartment 115. The airbag 110 may be configured to expand at least partially toward a driver or other vehicle occupant after an impact. Pedals 120, such as an accelerator pedal and a brake pedal, may also be located in the passenger compartment 115 underneath the instrument panel 105.

As discussed in greater detail below, the airbag 110 has multiple portions with fluidly connected chambers. Each portion may expand according to different timings. That is, one portion may expand immediately (e.g., within a few milliseconds) after a crash while another portion—the appendage—may expand on the order of tens of milliseconds later. The appendage may be configured to reduce certain forces that may be applied to the occupant's leg or foot following the impact.

Although illustrated as a sedan, the vehicle 100 may include any passenger or commercial vehicle such as a car, a truck, a sport utility vehicle, a taxi, a bus, etc. In some possible approaches, as discussed below, the vehicle 100 is an autonomous vehicle configured to operate in an autonomous (e.g., driverless) mode, a partially autonomous mode, and/or a non-autonomous mode.

Figure 2:
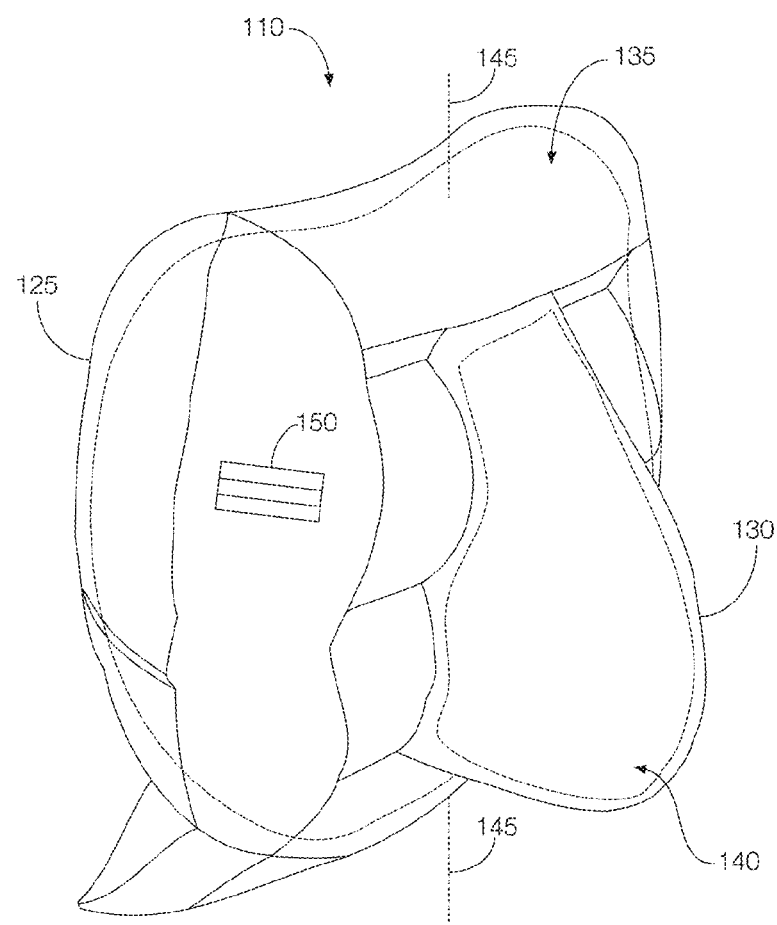
FIG. 2 illustrates one example airbag that may be used in the vehicle of FIG. 1.

FIG. 2 illustrates an example airbag 110 that may be used in the vehicle 100 of FIG. 1. The airbag 110 is shown in its expanded state after, e.g., a vehicle impact. The airbag 110 includes a primary portion 125 and a secondary portion 130 (e.g., an appendage) extending from the primary portion 125. The primary portion 125 may define a first chamber 135 and the secondary portion 130 may define a second chamber 140. The first and second chambers 135, 140 may be fluidly connected to one another.

When in the expanded state, the primary portion 125 may define a center axis 145. The center axis 145 may generally extend vertically (as shown in the figures) near or along the center of the airbag 110. The secondary portion 130 may be disposed on the primary portion 125 near or at least partially along the center axis 145. Moreover, the secondary portion 130 may generally be oriented vertically. When the airbag 110 expands, the primary portion 125 may be configured to limit a force applied to the occupant's knees while the secondary portion 130 may be configured to extend to a location between the occupant's legs. With the secondary portion 130 between the occupant's legs, the airbag 110 may reduce forces that would otherwise act on the occupant's leg or foot following a vehicle impact. Once such force could come from the occupant's leg or foot hitting one of the pedals 120. The secondary portion 130 of the airbag 110, therefore, may reduce lateral movement of the occupant's leg or foot to stop the occupant's leg or foot from hitting one of the pedals 120.

Although part of the same airbag 110, the primary and secondary portions 125, 130 may be configured to expand at different times or at different rates. For instance, the primary portion 125 may be configured to expand immediately (e.g., a few milliseconds) after a collision is detected while the secondary portion 130 may be configured to expand at a later time (e.g., on the order of tens of milliseconds after the impact is detected or after the primary portion 125 expands). Alternatively, both the primary and secondary portions 125, 130 could be expanded at substantially the same time (e.g., within a few milliseconds after the impact).

One way to control the firmness of the airbag 110 may be through the use of one or more vents 150. A vent 150 on the primary or secondary portion 125, 130 may reduce the firmness of that part of the airbag 110. In some implementations, both the primary and secondary portions 125, 130 may include one or more vents 150. Moreover, a vent 150 may be used to fluidly connect the first and second chambers 135, 140.

Figure 3:
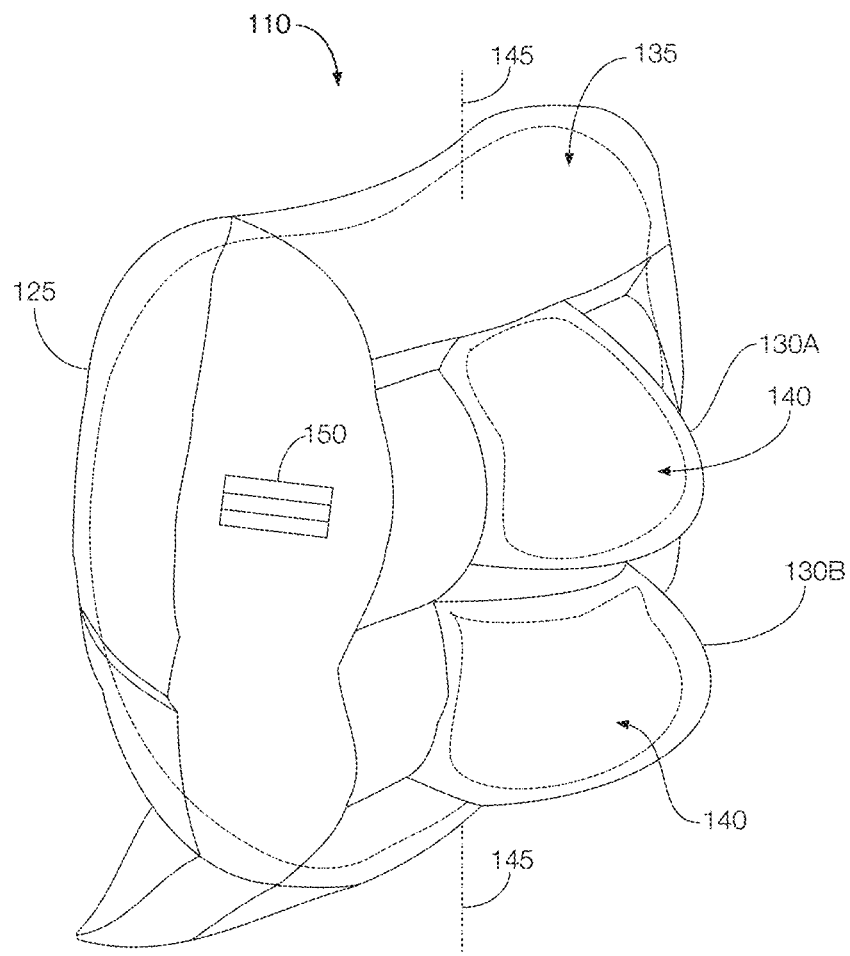
FIG. 3 illustrates another example airbag that may be used in the vehicle of FIG. 1.

FIG. 3 illustrates another example airbag 110 that may be used in the vehicle 100 of FIG. 1. As shown, the secondary portion 130 is divided into a first projection 130A and a second projection 130B. The first and second projection 130A, 130B may be spaced from one another or may, in some possible implementations, at least partially define the same chamber. As shown, the first projection 130A and the second projection 130B define separate chambers.

The first and second projection 130A, 130B may be deployed according to different timings relative to the primary portion 125 or one another. That is, one or both of the first and second projection 130A, 130B may be deployed at the same time (e.g., within a few milliseconds) of the primary portion 125. Otherwise, one or both of the first and second projection 130A, 130B may be deployed some time (e.g., on the order of tens of milliseconds) after the primary portion 125 is deployed.

Figure 4A:
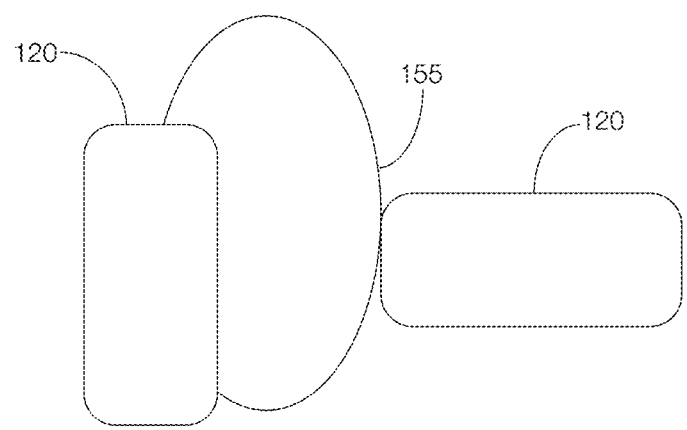
FIGS. 4A and 4B illustrate how the airbag of FIG. 2 or FIG. 3 may limit movement of an occupant's leg or foot following a vehicle impact.
Figure 4B:
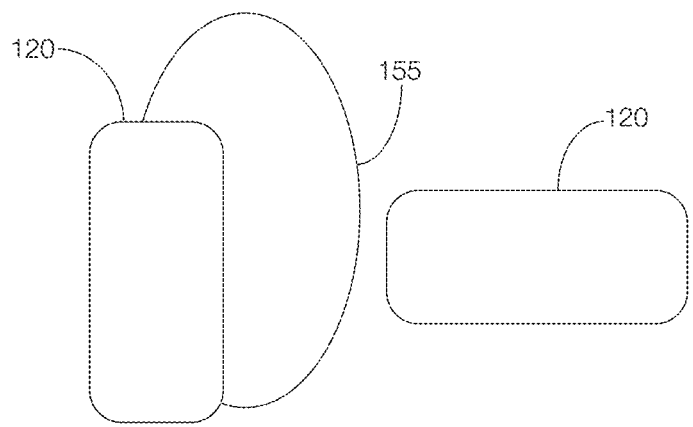

FIGS. 4A and 4B illustrate how the airbag 110 of FIG. 2 or FIG. 3 may limit movement of an occupant's leg or foot 155 following a vehicle impact. Referring to FIG. 4A, without the airbag 110, the occupant's leg and foot 155 are free to move laterally. Therefore, the occupant's foot 155 may collide with one of the pedals 120. As shown in FIG. 4B, however, the secondary portion 130 of the airbag 110 may limit lateral movement of the occupant's leg. The lateral movement may be limited sufficiently to prevent the occupant's foot 155 from impacting one of the pedals 120.

Figure 5:
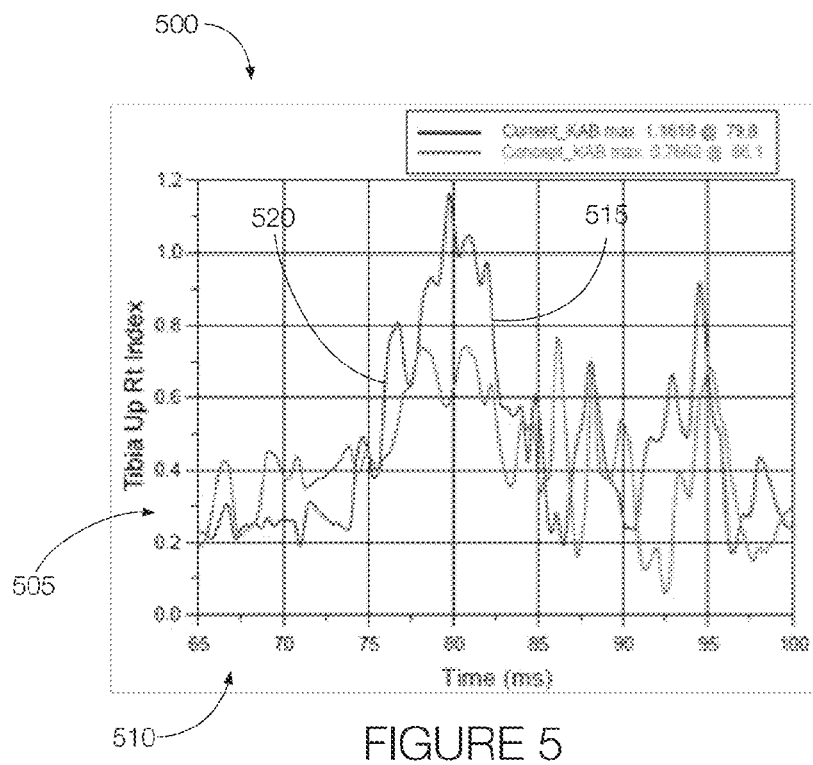
FIG. 5 is a graph comparing forces applied to an occupant's tibia with and without the airbag having an appendage.

FIG. 5 is a graph 500 comparing tibia indices applied to an occupant's tibia with and without the airbag 110 having an appendage. As shown, the x-axis 505 represents time and the y-axis 510 represents the tibia index function, which may indicate the combined forces and moments an occupant's leg would experience. The line 515 represents the tibia index function values for an airbag without the appendage while the line 520 represents the tibia index function values for an airbag 110 with the appendage. As shown, the peak tibia index function without an appendage is 1.1618, which occurred 79.8 ms after the impact. With the appendage, however, the peak tibia index function dropped to 0.7662. Moreover, the peak tibia index function for the airbag 110 with the appendage occurred 6.3 ms later—at 86.1 ms—than without the appendage.

Figure 6:
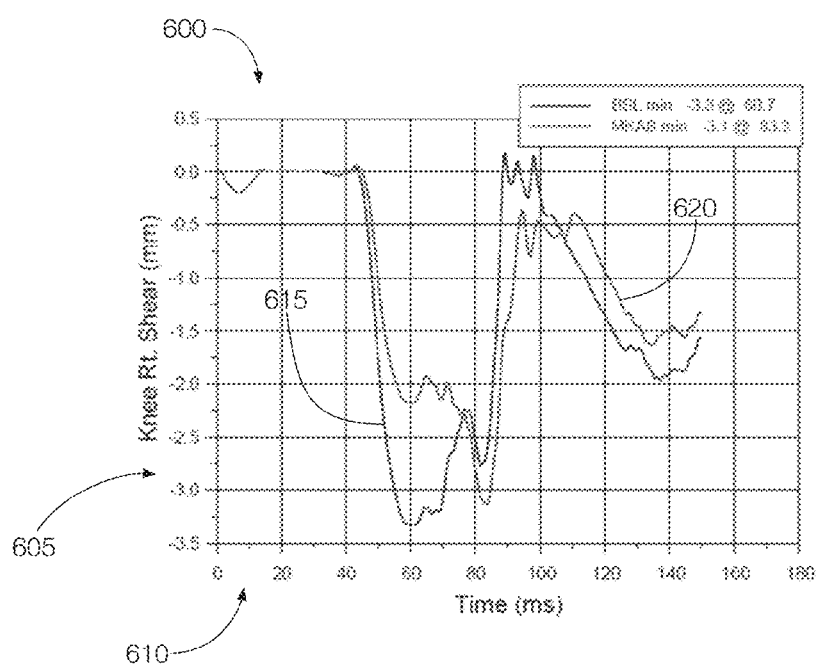
FIG. 6 is a graph comparing shearing forces applied to an occupant's tibia with and without the airbag having an appendage.

FIG. 6 is a graph 600 comparing right knee shear of an occupant with and without the airbag 110 having an appendage. The x-axis 605 represents time and the y-axis 610 represents the shear displacement, e.g., the lateral movement of the occupant's knee during simulated collisions, in millimeters. The line 615 represents the amount of shear experienced by the occupant with an airbag that does not have the appendage. The line 620 represents the amount of shear with an airbag 110 that has the appendage.

For the airbag without the appendage, the peak shear displacement is 3.3 mm and occurs approximately 60.7 ms after the impact. With the appendage, however, the peak shear displacement is reduced to 3.1 mm and occurs 83.3 ms after the impact, which is significantly later than without the appendage.

Not only is the shear displacement more significant without the appendage, the magnitude of the shear displacement is greater for a longer amount of time. For instance, without the appendage, the shear displacement exceeds 3.0 mm for approximately 20 ms. With the appendage, however, the shear displacement only exceeds 3.0 mm for approximately 5 ms.

Accordingly, the airbag 110 with the appendage (e.g., the secondary portion 130) may reduce the force applied to an occupant's leg, specifically the driver's leg, following an impact. Immediately after certain types of impacts, one or both of the driver's legs are susceptible to move laterally. This lateral movement may cause one of the driver's feet to hit one of the pedals 120. The appendage may mitigate such lateral movement, thus reducing the force caused by, e.g., the driver's leg or foot 155 hitting one of the pedals 120.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An airbag comprising:
a primary portion; and
a secondary portion extending from the primary portion,
wherein the primary portion defines a first chamber and the secondary portion defines a second chamber fluidly connected to the first chamber, and
wherein the primary portion defines a center axis and the secondary portion extends along the center axis in a direction perpendicular to the center axis, the secondary portion extending beyond the primary portion in the direction perpendicular to the center axis;
wherein the secondary portion is configured to expand to a location between a vehicle occupant's lower legs and to reduce lateral movement of the lower legs;

wherein the primary portion expands at a first time and the secondary portion expands at a second time, wherein the second time begins after the primary portion has finished expanding.

2. The airbag of claim 1, wherein the secondary portion defines a first projection and a second projection spaced from the first projection.

3. The airbag of claim 2, wherein at least one of the first projection and the second projection define the second chamber.

4. The airbag of claim 2, wherein at least one of the first projection and the second projection define a third chamber.

5. The airbag of claim 1, wherein the primary portion and the secondary portion are configured to expand in response to a vehicle impact.

6. The airbag of claim 1, further comprising a vent disposed on at least one of the primary portion and the secondary portion.

7. The airbag of claim 1, wherein the secondary portion is configured to expand to a location between the vehicle occupant's legs in response to a vehicle impact.

8. The airbag of claim 1, wherein the secondary portion is configured to reduce a force applied to the vehicle occupant's leg or foot from a vehicle impact.

9. The airbag of claim 1, wherein the secondary portion is configured to reduce lateral movement of the vehicle occupant's leg or foot after a vehicle impact.

10. A vehicle system comprising:
an airbag stowed in an unexpanded state below an instrument panel and configured to expand in response to a vehicle impact;
wherein the airbag includes a primary portion defining a first chamber and a secondary portion defining a second chamber fluidly connected to the first chamber,
wherein the primary portion defines a center axis and the secondary portion extends along the center axis in a direction perpendicular to the center axis, the secondary portion extending beyond the primary portion in the direction perpendicular to the center axis,
wherein the secondary portion is configured to expand to a location between a vehicle occupant's lower legs in response to the vehicle impact and to reduce lateral movement of the lower legs,
wherein the primary portion expands at a first time and the secondary portion expands at a second time, wherein the second time begins after the primary portion has finished expanding.

11. The vehicle system of claim 10, wherein the secondary portion defines a first projection and a second projection spaced from the first projection.

12. The vehicle system of claim 10, wherein the airbag further includes a vent.

13. The vehicle system of claim 10, wherein the secondary portion is configured to reduce a force applied to the vehicle occupant's leg or foot from the vehicle impact.

14. The vehicle system of claim 10, wherein the secondary portion is configured to reduce lateral movement of the vehicle occupant's leg or foot after the vehicle impact.

15. A vehicle system, comprising:
an airbag stowed in an unexpanded state below an instrument panel and configured to expand in response to a vehicle impact wherein the airbag includes a primary portion defining a first chamber and a center axis; and
means for reducing lateral movement of a vehicle occupant's lower legs including a secondary portion configured to extend along the center axis in a direction perpendicular to the center axis, the secondary portion extending beyond the primary portion in the direction perpendicular to the center axis,
wherein the primary portion expands at a first time and the secondary portion expands at a second time, wherein the second time begins after the primary portion has finished expanding.

* * * * *